March 16, 1926.

T. G. SCHMEISER

AUTOMOBILE BED

Filed Sept. 25, 1924

1,577,425

INVENTOR
Theodore G. Schmeiser
BY John A. Naismith
ATTORNEY

Patented Mar. 16, 1926.

1,577,425

UNITED STATES PATENT OFFICE.

THEODORE G. SCHMEISER, OF DAVIS, CALIFORNIA.

AUTOMOBILE BED.

Application filed September 25, 1924. Serial No. 739,814.

*To all whom it may concern:*

Be it known that I, THEODORE G. SCHMEISER, a citizen of the United States, and a resident of Davis, in the county of Yolo and State of California, have invented certain new and useful Improvements in Automobile Beds, of which the following is a specification.

The present invention has for its object to convert a two-seated automobile bed into a comfortable sleeping bed of full length, without material or expensive alterations in the seats or body.

This object I accomplish by separating the front seat from its base, assuming that it is otherwise separated from the body of the vehicle, turning the front seat backwardly through an arc of ninety degrees, and shifting it bodily so that the back of said seat rests on the base with its upholstery disposed so as to serve as one end of the bed, and positioning the removable cushions of the front and rear seats so as to form the opposite end and intermediate portions of the bed.

I find that the late models of so-called "sedans" made by Dodge Brothers of Detroit, Michigan, are ideally suited to conversion in this manner, and I have therefore illustrated my invention as applied to this type of automobile, although it is to be understood that the same is applicable to other types of vehicles.

Referring in detail to the accompanying drawing, the floor of an automobile body is indicated at 1, and this floor is provided with a base 2 which supports the front seat and a base 3 which supports the rear seat.

There are certain features in a Dodge sedan that render the present invention easy of application thereto, for the reason that the front seat is not connected at its sides to the body of the vehicle, and the bottom of said seat is hinged to the base 2 so as to permit the seat to be tilted forwardly, whereby to uncover a compartment for tools and provide greater space between the front and rear seats for the convenience of the passengers for getting into and out of the tonneau.

Figure 1:
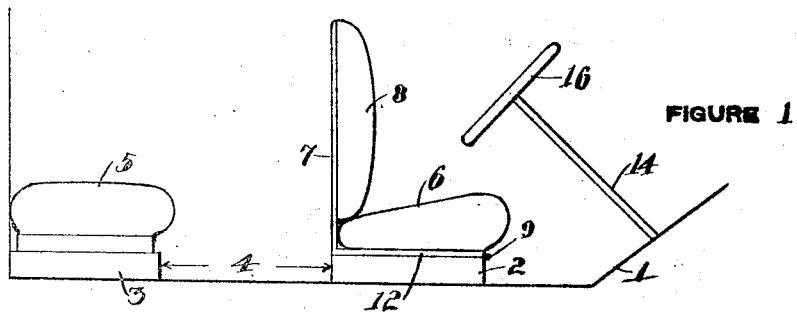
Figure 1 is a longitudinal sectional view through a portion of a Dodge sedan body with the several parts in their normal positions.
Figure 2:
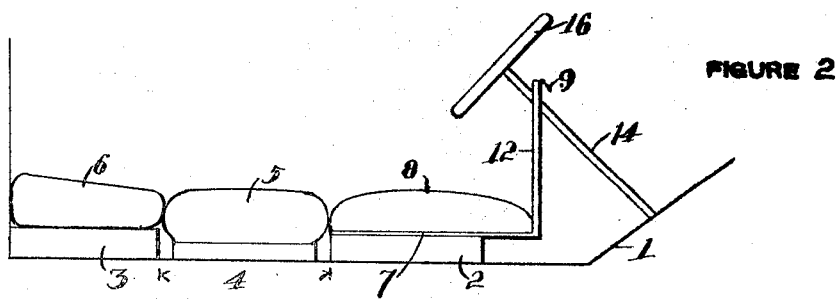
Figure 2 is a longitudinal sectional view through a portion of a Dodge sedan body with the several parts arranged in accordance with my invention.
Figure 3:
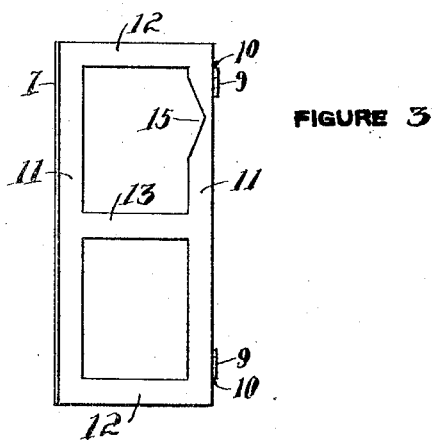
Figure 3 is a plan view on line 3—3 of Figure 1.

The space 4 between the front and rear seats is just wide enough to receive the rear seat cushion 5. This rear seat cushion 5 is of greater height than the front seat cushion 6, so that when the latter is placed upon the base 3 of the rear seat the two cushions 5 and 6 lie substantially flush, as shown in Fig. 2, and will serve to form the head and intermediate portion of the bed.

The bottom portion of the frame 7 of the front seat is normally connected to the edge of the base 2 by means of hinges 9. These hinges in the present invention are so altered as to be capable of being separated or detached. This may be done by providing removable pins 10 or otherwise, so as to permit quick and easy detachment of the front seat frame from the base 2.

The back portion of the front seat is provided with upholstery 8 and the bottom portion of said front seat frame is in the form of an open frame made up of parallel side bars 11, and end bars 12 with a central cross-bar 13.

In the front side bar 11 at the inner edge thereof at a point lying in line with the steering posts 14 of the vehicle, is formed a notch or cut-away portion 15.

Assuming that the hinges 9 have been separated or detached so that the front seat frame 7 may be removed from its base 2, the said seat frame is then turned rearwardly through an arc of ninety degrees so that the bottom portion thereof stands vertically. This bottom portion then is slipped over the steering wheel 16 and the seat frame is adjusted as shown in Fig. 2, so that the back portion thereof rests upon the base 2 with the upholstery 8 exposed so as to constitute the foot portion of the bed. In this position the upstanding bottom portion of the seat frame will serve to constitute a foot-piece and will be held in proper position by reason of its engagement with the steering post 14.

The height of the base 2 and the thickness of the upholstery 8 are such that when arranged as described the upper surface of the upholstery lies substantially flush with the upper surface of the cushions 5 and 6, thus forming a comfortable and roomy bed approximately 6 feet in length.

To convert a sedan of the Dodge type into a bed of this sort requires no material alterations in the body or seats of the vehicle, other than such changes as are necessary to make the hinges detachable. This can be done by one of ordinary skill in a matter of thirty minutes' time. Once these changes are made the operation of making up the bed requires but a few minutes' time.

It is to be understood, of course, that while I have herein shown and described one specific embodiment of the invention, changes in form, construction and method of arrangement and operation may be made within the scope of the appended claims.

I claim:

1. A method of converting a two-seated automobile body into a bed, which consists of disconnecting the front seat from its base, turning the seat backwardly through an arc of ninety degrees, and shifting it so that the upholstered back lies on the base of the front seat and serves to form one end of a bed, and disposing cushions between the rear seat and back of the front seat to complete the bed.

2. A method of converting a two-seated automobile body into a bed, which consists of disconnecting the front seat from its base, turning said seat backwardly through an arc of ninety degrees, and shifting it bodily so that the upholstered back lies on the base of the front seat and serves to form one end of the bed, disposing the front seat cushion on the rear seat and the rear seat cushion in the space between the front and rear seats, to complete the bed.

3. A method of converting a two-seated automobile body into a bed, which consists of disconnecting the front seat from its base, turning said seat backwardly through an arc of ninety degrees, and shifting it forwardly to bring the vertically disposed bottom portion thereof into engagement with the steering post of the vehicle, with the upholstered back resting in horizontal position on the base, and disposing cushions between the back of the front seat and the rear seat to complete the bed.

THEODORE G. SCHMEISER.